Sept. 20, 1938.  R. M. ROBESON  2,130,652

GATE VALVE BODY

Filed April 26, 1937

RALPH M. ROBESON
INVENTOR

ATTORNEY

Patented Sept. 20, 1938

2,130,652

UNITED STATES PATENT OFFICE 2,130,652

GATE VALVE BODY

Ralph M. Robeson, Los Angeles, Calif.

Application April 26, 1937, Serial No. 138,963

2 Claims. (Cl. 251—155)

The object of my invention is to provide an improved body for gate valves, in which the seats are formed in an independent element removable from the body and not subject to distortion due to pipe line strains.

The invention may best be understood with reference to the attached drawing and the following description thereof, in which Fig. 1 is a vertical longitudinal section through the center line of the run of the valve, as on the line 1—1 of Fig. 2;

Figure 2:
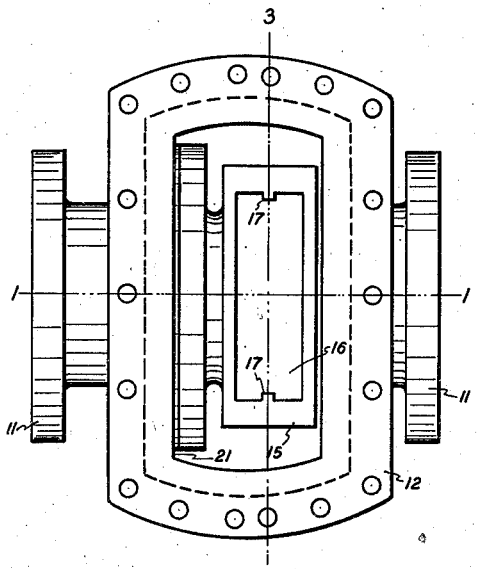
Fig. 2 is a plan view of the valve, as on the line 2—2 of Fig. 1.
Figure 4:
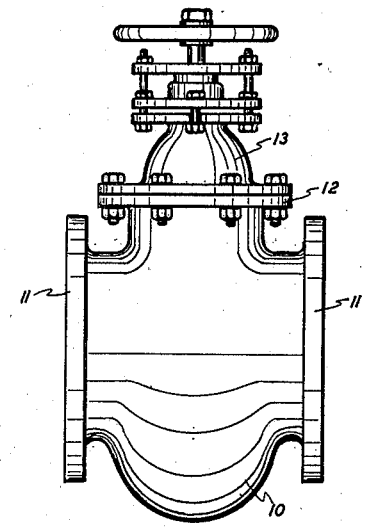
Fig. 4 is an elevation, on a reduced scale, of the valve body of my invention provided with the conventional bonnet, gland, and hand wheel of a gate valve of the non-rising stem type.
Figure 1:
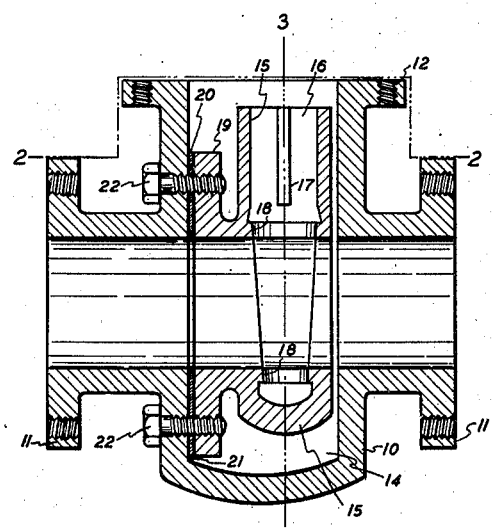
Figure 3:
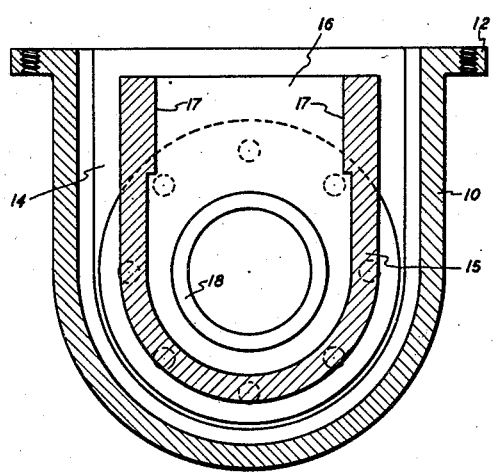
Fig. 3 is a cross-section through the valve, as on the line 3—3 of Figs. 1 and 2.

It should be understood that the valve body, to which the claims are restricted, may be used in the construction of any type of gate valve, either the non-rising stem illustrated or the equally well known outside screw and yoke pattern.

Referring to the figures, the outer body member 10 has the conventional pipe attachment flanges 11—11 and the upper flange 12 for attaching the bonnet 13. This member includes a well 14 for the reception of the inserted seat member 15.

The seat member is so formed as to provide a secondary well 16 in which the usual wedge or solid discs ride on the guides 17, these discs bearing against the ring seats 18, which may be integral with seat member 15 or may be inserted therein, as desired. This member is provided with a flange 19 which is drawn against a gasket 20 bearing on the faced inner side 21 of well 14 by a plurality of bolts 22. It will be noted that the seat member 15 is attached to only one side of body member 10 and does not touch this member at ony other point.

The structure described, in which the valve disc seats are carried in a removable member attached to the body at one side only has three major advantages over conventional types of valves in which the seats are formed in or inserted into the body itself.

First, valves carrying high pressures or temperatures are often warped or distorted by pipe line strains. In the conventional valves the seats are distorted along with the body and tightness is then destroyed. In my improved valve such strains do not come on the inserted seat member, which thus may remain tight for a much longer period.

Second, when the conventional valve begins to leak and requires refitting the entire valve must be sent to the factory, at a high transportation cost for valves of large size. When my improved valve requires reseating, only the inserted seat member together with the discs need be sent.

Third, when refitting is required, the leaky inserted seat member and discs may be removed from the valve and another seat member with fitted discs inserted without removing the valve from the line. This is possible, with the conventional inserted seat valves, only when there has been no warping of the body.

I claim as my invention:

1. In a gate valve body: an external body member having a well and a removable unitary seat member therein, said seat member being nonleakably attached to only one face of said well and embodying a seat adapted to mate with a rigid valve disk and an element opposed to said seat and arranged to hold said disk against said seat.

2. In a gate valve: a body member having a well; a removable unitary seat member therein and nonleakably attached to only one face of said well; a rigid valve disk and external means for raising and lowering said disk; said seat member embodying a seat for said disk and a face opposed to said seat for urging said disk against said seat when said disk is lowered.

RALPH M. ROBESON.